United States Patent
Yik et al.

(10) Patent No.: US 7,257,134 B2
(45) Date of Patent: Aug. 14, 2007

(54) METHOD OF PACING THE SYNCHRONIZATION OF ROUTING INFORMATION IN A DATA SWITCHING ENVIRONMENT

(75) Inventors: James Ching-Shau Yik, Mission Viejo, CA (US); Eric Lin, Hacienda Heights, CA (US)

(73) Assignee: Zarlink Semiconductor V.N. Inc., Irvine, CA (US)

( * ) Notice: Subject to any disclaimer, the term of this patent is extended or adjusted under 35 U.S.C. 154(b) by 928 days.

(21) Appl. No.: 09/969,702

(22) Filed: Oct. 3, 2001

(65) Prior Publication Data

US 2003/0063610 A1   Apr. 3, 2003

(51) Int. Cl.
*H04J 3/06*   (2006.01)
*H04L 12/66*   (2006.01)
*H04L 12/56*   (2006.01)
*G06F 15/173*   (2006.01)

(52) U.S. Cl. .................. 370/509; 370/352; 370/389; 370/511; 370/503; 709/223

(58) Field of Classification Search .......... 370/338, 370/350, 352, 356, 389–395.6, 396.1, 397, 370/400–409, 463–467, 474, 503, 396, 905, 370/254

See application file for complete search history.

(56) References Cited

U.S. PATENT DOCUMENTS

| | | |
|---|---|---|
| 5,086,428 A | 2/1992 | Lauck et al. |
| 6,097,718 A | 8/2000 | Bion |
| 6,104,696 A | 8/2000 | Kadambi et al. |
| 6,154,446 A | 11/2000 | Kadambi et al. |
| 6,198,920 B1 * | 3/2001 | Doviak et al. ........... 455/426.1 |
| 6,711,411 B1 * | 3/2004 | Ruffini ........................ 455/502 |
| 6,735,198 B1 * | 5/2004 | Edsall et al. ................. 370/389 |
| 6,775,709 B1 * | 8/2004 | Elliott ......................... 709/238 |
| 6,807,172 B1 * | 10/2004 | Levenson et al. ........... 370/389 |
| 6,901,594 B1 * | 5/2005 | Cain et al. ................... 719/310 |
| 2002/0046271 A1* | 4/2002 | Huang ......................... 709/223 |
| 2003/0017845 A1* | 1/2003 | Doviak et al. .............. 455/556 |

FOREIGN PATENT DOCUMENTS

| | | |
|---|---|---|
| DE | 19860120 A1 | 7/1998 |
| EP | 1037433 A | 9/2000 |
| GB | 2 362 538 | 11/2001 |

* cited by examiner

*Primary Examiner*—Seema S. Rao
*Assistant Examiner*—Venkatesh Haliyur
(74) *Attorney, Agent, or Firm*—Lawrence E. Laubscher, Jr.

(57) ABSTRACT

A method of synchronizing the information held in a switching database associated with a switching function of a data switching node, with a data network node identifier record associated with a management processor enabling a managed mode thereof is provided. An entry of the switching database is modified. A status specifier corresponding to the modified entry is set to signify the modification thereof. An inspection of the switching database is initiated on the expiration of an adjustable timer, and the information held in modified switching database entries is synchronized with the data network node identifier record. This method of synchronization of the information held in the switching database spreads out of burst changes thereof over time. The advantages are derived from the use of a more economical management processor while providing the same or enhanced levels of service of the data switching node.

17 Claims, 3 Drawing Sheets

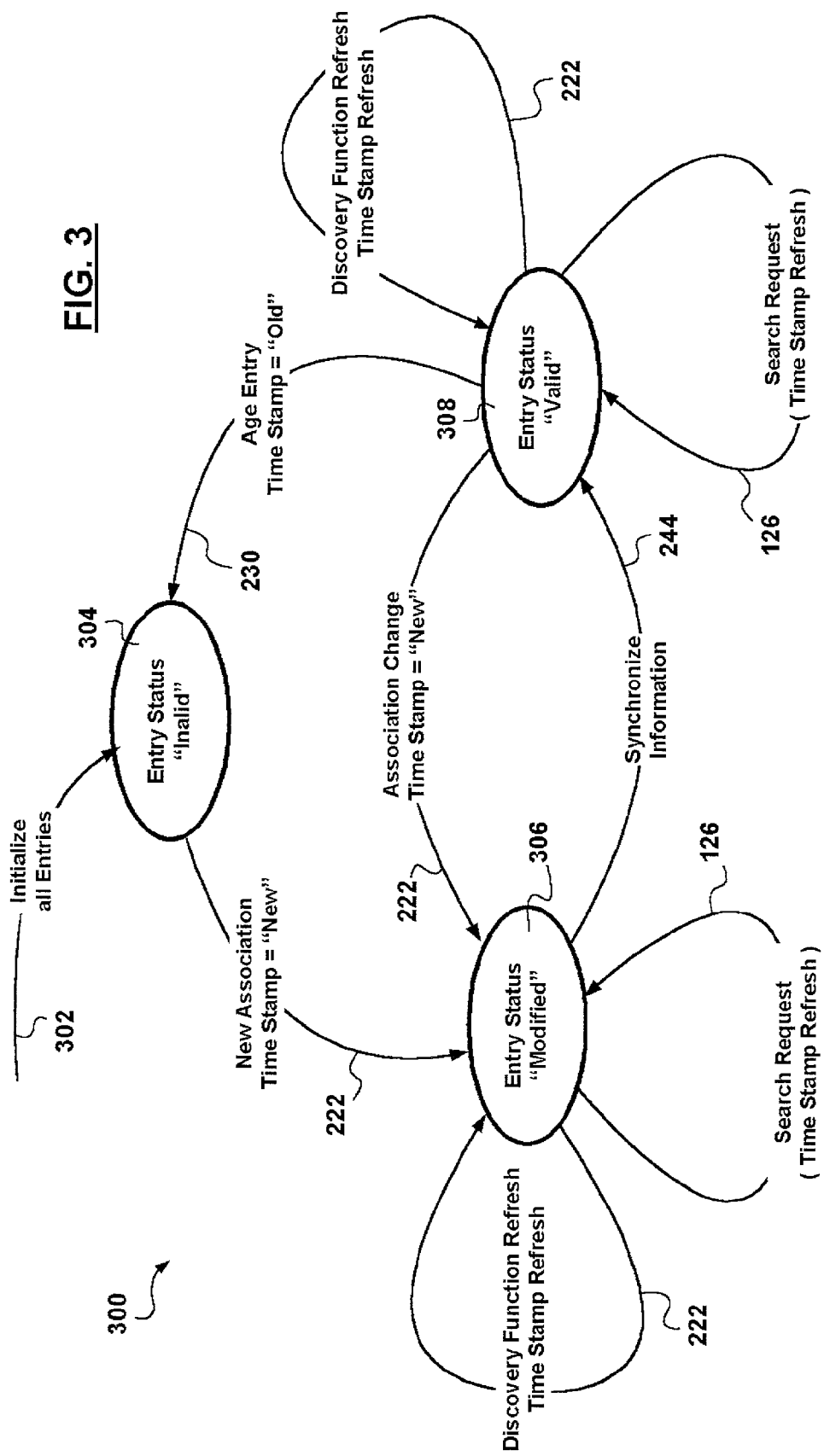

METHOD OF PACING THE SYNCHRONIZATION OF ROUTING INFORMATION IN A DATA SWITCHING ENVIRONMENT

FIELD OF THE INVENTION

The invention relates to data switching, and in particular to methods and apparatus for synchronizing routing information between a switching database associated with a switching function of a data switching node and a data network node identifier record associated with a management processor enabling a managed mode operation thereof.

BACKGROUND OF THE INVENTION

In the field of data switching, the storage of routing information is necessary to enable fast data switching functionality of data switching nodes participating in a data transport network. Data switching nodes are multi-ported data network nodes forwarding Protocol Data Units (PDUs) (also known as Payload Data Units) generated by origination data network nodes and sent over the data transport network towards destination data network nodes. Each data network node has an associated data network node identifier associated therewith.

FIG. 1 is a schematic diagram showing elements implementing general functionality of a data switching node 100.

The data switching node 100, performs a switching function 102 on PDUs received 104 via a plurality of physical ports 106.

Received PDUs (104) are typically stored in processing queues collectively shown in FIG. 1 as PDU processing buffer 108. The invention is not limited to implementations of data switching nodes having PDU processing queues. Implementations of data switching nodes not buffering PDUs for processing exist.

Each PDU includes a header and a payload. The PDU header specifies routing information used by the switching function 102 to determine an output port 106 via which to forward 110 each PDU towards an intended destination data network node. The PDU header includes routing information such as data network node identifiers corresponding to an origination data network node that generated the PDU and a destination data network node for the PDU. One example of a data network node identifier includes a Media Access Control ADDRess (MAC ADDR) which is a unique designation of a type of data transport network interface component. The invention is not limited to MAC ADDR type data network node identifiers.

In performing the switching function 102, the data switching node 100 determines an output port 104 via which to forward each PDU. It is necessary for the switching function 102 to have available information specifying which data network nodes are reachable via a particular physical port 106. For this purpose, received PDUs (104) are inspected by a data network node identifier discovery function of the data switching node 100 shown in FIG. 1 as a MAC ADDR discovery function 120.

For each PDU received via a specific input physical port 106, the MAC ADDR discovery function 120 extracts the origination data network node identifier from the PDU's header and reports 122 the pair including: the physical port designation via which the PDU was received (the input port designation) and the origination data network node identifier of the data network node that generated the PDU; to a switching database. The switching database is shown as a MAC ADDR database 124. A tabular representation thereof includes row entries comprising specifiers holding: a data network node identifier and a port designation.

In processing and forwarding PDUs, the switching function 102 makes use of the switching database 124 to determine output ports 106 via which to forward PDUs. The switching function 102 requests a search 126 of the switching database 124 using as a key the destination data network node identifier extracted from the header of each PDU being processed.

If an entry corresponding to the destination data network node identifier exists in the switching database 124, search 126 provides the corresponding output port 106 via which to forward 110 the PDU.

If an entry corresponding to the destination data network node identifier is not found in the switching database 124, the PDU being processed is flooded to all output ports 106 of the data switching node 100.

Efficient operation of the data switching node 100 and in particular of the switching function 102 is dependent on efficient access to the switching database 124. For this reason implementations of the switching database 124 include hardware implementations.

Hardware implementations of the switching database 124, although necessary, are expensive. The costs related to the development, optimization, and manufacturing thereof. A balance is struck at the design phase of the data switching equipment between the size of the switching database 124 and performance capabilities of the data switching node 100. Having a limited storage capacity, the memory space in the switching database 124 should not be squandered. Switching database entries no longer used have to be discarded to enable the establishment of new associations between ports and data network node identifiers.

An entry aging function 128 is used to police 130 the usage of the memory space of the switching database 124. The entry aging function 128 makes use of a time stamp specifier field associated with each entry in the switching database 124, the time stamp specifier field holding a time value at which the entry was either created or last accessed.

In establishing 122 a new association between a data network node identifier and a port 106, the time stamp specifier is populated with a time value corresponding to the time at which the association was created. In receiving subsequent PDUs with the same association between an origination data network node identifier and port 106 the time stamp specifier corresponding to the entry is refreshed (122). In searching 126 the switching database 124 for a particular entry, the time stamp value of the entry is refreshed.

In identifying stale switching database entries which have not been used for a long period of time, the entry aging function 128 inspects 130 each entry in the switching database 124 to identify entries which were either not created nor accessed within a predetermined period of time expiring at the time of the inspection 130. Subsequent to the identification of stale entries in the switching database 124, the entry aging function 128 makes the memory storage space allocated to stale entries available for further associations to be made.

The operation of the data switching node 100 typically includes a managed mode of operation in which a management processor 150 is used to oversee the function of, and/or augment the available services at, the data switching node 100. In performing its intended function, the management processor 150 maintains a (MAC ADDR) record 152 of the associations between data network node identifiers and corresponding ports 106. As such, the management processor is updated with changes made to the switching database 124.

A typical implementation of the update functionality between the switching database 124 and the MAC ADDR record 152 includes a message queue 154 having a size. The message queue 154 stores a limited number of messages pending processing detailing switching database changes. The size of the message queue 154 limits a number of messages that can be stored therein. Switching database change messages are issued by the MAC ADDR discovery function 120 as schematically shown at 156 and/or the entry aging function 128 as schematically shown at 158.

The issuance of switching database change messages 156 and 158, and the update of the MAC ADDR record 152 are decoupled by the use of the message queue 154. The management processor 150, in performing its function services 160 the message queue 154 by processing pending messages stored therein.

In optimizing the performance of the data switching node 100, design requirements for the switching function 102 call for the utilization of the highest processing power available. The components and methods used to implement the data switching function are at the cutting edge of the technology available at the time of development.

To balance costs, the processing power of the management processor 150 is sacrificed to levels adequate in performing the management of the data switching node 100 and providing the augmented services. A variable in the cost/performance balance with respect to synchronizing the switching database 12 and the MAC ADDR record 152 is the size of the message queue 154. The size of the message queue 154 is typically chosen to provide storage for a predetermined time averaged number of messages expected to await processing in the message queue 154 based on a time averaged performance of the data switching node 100.

Situations arise, as is the case during but not limited to: data network startup, recovery from network failure, excessive requests for the establishment of web browsing connections, intensive bursts of new data traffic, etc. in which a large number of data connection are setup and a corresponding number of entries of the switching database 124 are changed. In such instances the message storage capacity of the message queue 154 is exceeded. As a result, the MAC ADDR discovery function 120 is temporarily halted.

Subsequent to a network failure, the entry aging function 128 discards a large number of entries in the switching database generating a large number of switching database change messages 158.

Compounding the situation, the management processor 150 typically cannot service the queue 154 fast enough and the message queue 154 fills up.

Current implementations of the managed mode of operation of data switching equipment such as the data network node 100 prevent the successful establishment of the association between newly discovered data network node identifiers and corresponding ports, without successfully queuing the message 156 in the message queue 154. The MAC ADDR discovery function 120 is temporarily halted in order to prevent potential loss of information synchronization between the switching database 124 and the MAC ADDR record 152, which compounds the problem because of the above mentioned behavior of data switching equipment according to which PDUs having an unknown output port 106 to be forwarded to, are flooded to all output ports 106 of the data switching node 100.

A common method of conveying PDUs across a data transport network includes the breakup of large PDUs (themselves being a part of a sequences of PDUs) into a subsequences of PDUs of a smaller size (in accordance with data transport protocols based on bandwidth availability at intermediary data transport equipment). A times during which the message queue 154 is full, all subsequence PDUs are flooded to all ports 106 severely impacting data throughput at the data switching node 100.

There therefore is a need to smooth out the synchronization of burst changes of the information held in the switching database during a managed mode of operation of the data switching node.

SUMMARY OF THE INVENTION

In accordance with an aspect of the invention, a method of synchronizing the information held in a switching database associated with a switching function of a data switching node, with a data network node identifier record associated with a management processor enabling a managed mode of operation of the data switching node is provided. The method includes a sequence of steps. An entry of the switching database is modified. A status specifier corresponding to the modified entry is set to signify the modification thereof. An inspection of the switching database is initiated on the expiration of an adjustable timer, and the information held in modified switching database entries is synchronized with the data network node identifier record. This method of synchronization of the information held in the switching database spreads out of burst changes thereof over time.

In accordance with another aspect of the invention, a data switching node is provided. The data switching node includes components enabling information exchange internal to the data switching node. A switching database holds entries specifying associations between data network node identifiers and at least one of a plurality of ports of the data switching node to enable the forwarding of PDU. A management processor monitoring the operation of the data switching node and/or augmenting the services available, maintains a data network node identifier record. An information synchronizing component is adapted to synchronize the information stored in the switching database with the data network node identifier record. An adjustable timer is used to trigger the information synchronization component into operation on the expiration thereof. The design smoothes out the effect of burst changes in the information held in the switching database by spreading the information synchronization over time.

The advantages are derived from the use of a more economical management processor and the reduction of the storage requirement of the switching database change message queue while providing the same or enhanced levels of service of the data switching node.

BRIEF DESCRIPTION OF THE DRAWINGS

The features and advantages of the invention will become more apparent from the following detailed description of the preferred embodiment(s) with reference to the attached diagrams wherein:

FIG. 3 is a state diagram showing states and state transitions used in specifying the status of entries in a database in accordance with an exemplary embodiment of the invention.

It will be noted that in the attached diagrams like features bear similar labels.

DETAILED DESCRIPTION OF THE EMBODIMENTS

In accordance with a preferred embodiment: the function of the message queue 154 is augmented by an information synchronization function (240), and entries in the switching database are augmented with a status specifier (234).

Figure 1:
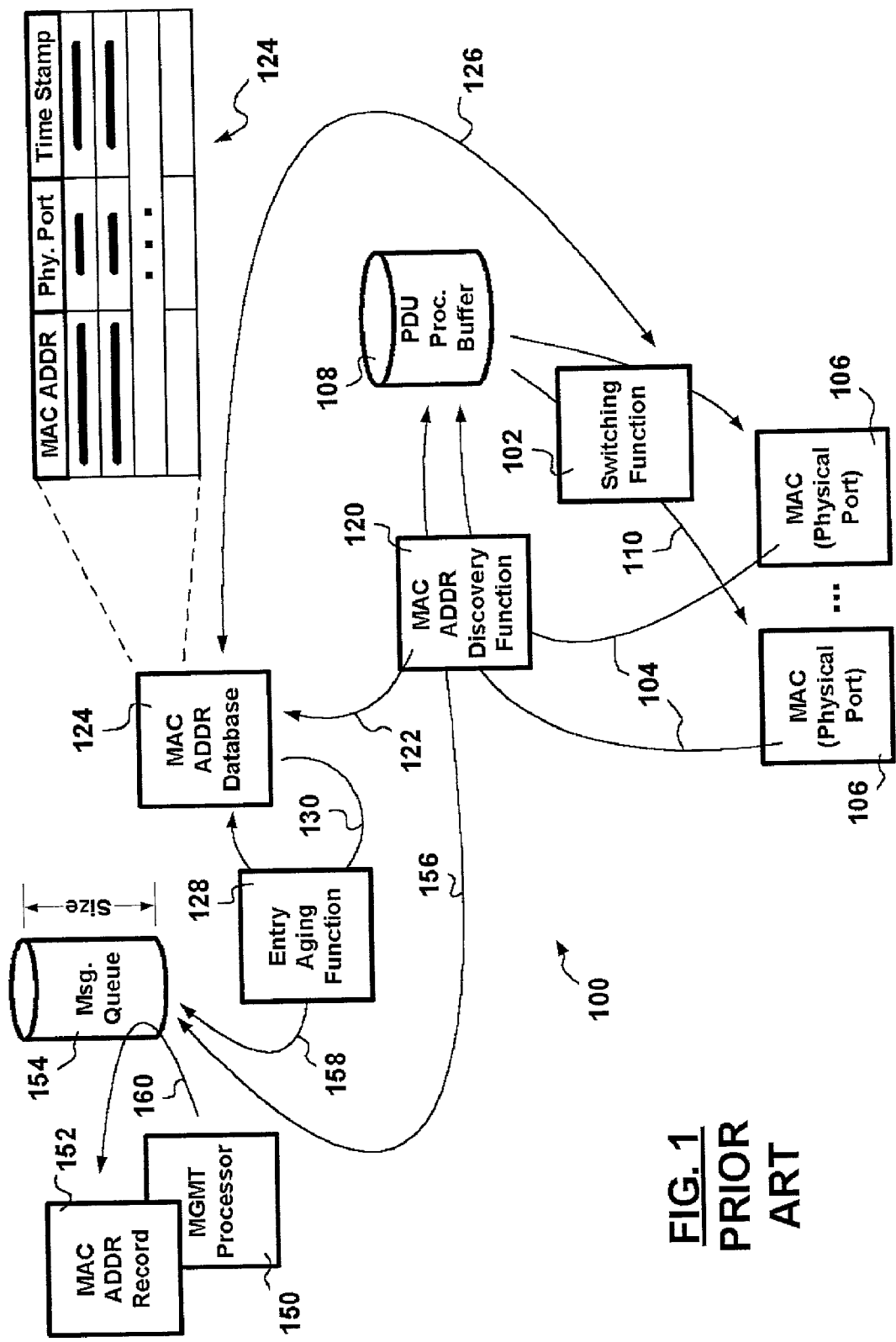
FIG. 1 is a schematic diagram showing elements implementing general functionality of a data switching node.
Figure 2:
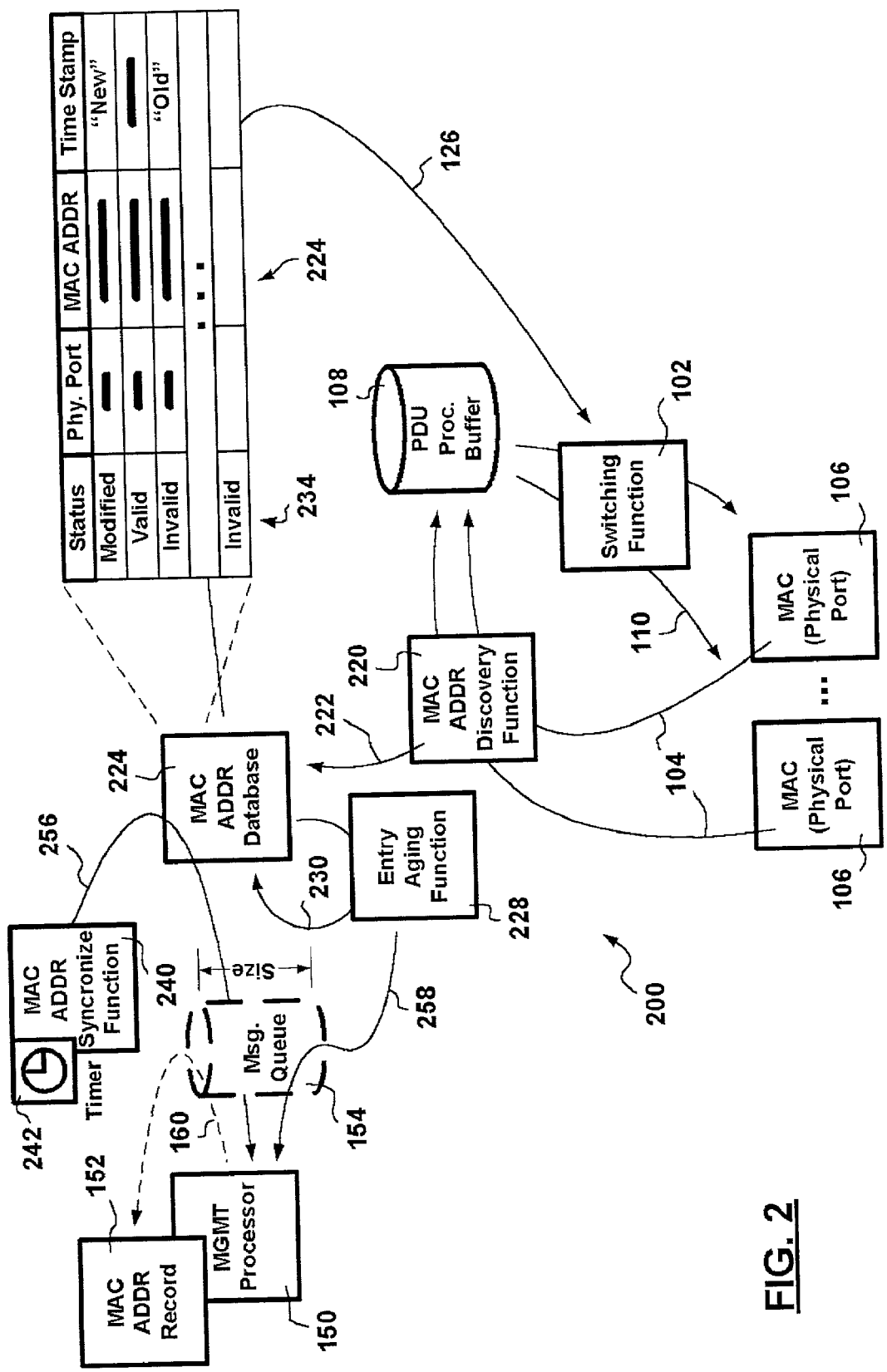
FIG. 2 is a schematic diagram showing elements implementing a data switching node in accordance with an exemplary embodiment of the invention.

FIG. 2 is a schematic diagram showing elements implementing a data switching node 200 in accordance with an exemplary embodiment of the invention. FIG. 3 is a state diagram showing states and state transitions used in specifying the status of entries in a database in accordance with an exemplary embodiment of the invention.

The status specifier 234 associated with each entry in the switching database 224 specifies, without limiting the invention, whether the entry is in an "invalid" state, a "modified" state or a "valid" state. On start-up all state specifiers 234 are reset as shown at 302 to the "invalid" state 304.

In operation, the MAC ADDR discovery function 220, inspects each PDU header of PDUs received (104) via one of the input ports 106 and extracts the origination data network node identifier specified therein. Having the origination data network node identifier and the input port 106 on which the PDU was received, the MAC ADDR discovery function 220 updates 222 the switching database 224.

In updating 222 the switching database 224, a search of the switching database 224 is performed using the origination data network node identifier as a key. If no entry is found to correspond to the origination data network node identifier, then an entry having an "invalid" status is used to establish the association between the origination data network node and the input port. Subsequent to populating the data network node specifier field and the port specifier field, the time stamp specifier is populated with the current system time and the entry is said to be in a "modified" state 306 by populating the status specifier 234 accordingly. Entries in the modified state 306 are available for forwarding subsequence PDUs and may be refreshed by the arrival of new PDUs with the same association as shown in FIG. 3.

The information synchronization function 240 may be implemented as an information synchronization component including but not limited to: a special function processor, a memory access device such as a Direct Memory Access (DMA) device, a process executed by the management processor 150.

In accordance with an embodiment of the invention, the MAC address synchronization function 240 is triggered into operation via a timer 242. The timer 242 is used to pace the information synchronization.

On the expiration of the timer 242, the information synchronization function 240 inspects the switching database 224 to identify entries having a "modified" status 306. Switching database change messages 244 are sent to the management processor 150 and the entry is in a "valid" state 308.

To match the processing speed of the management processor 150 or a processing bandwidth of the management processor 150 allocated for the maintenance of the MAC ADDR record 152 different techniques can be implemented including:

using the timer 242 to synchronize one entry in the "modified" state 306, the processing speed of the information synchronization component 240 may be chosen/adjusted to match the processing speed of the management processor 150, or the management processor 150 is adapted to access the switching database 224 directly subsequent to searching the switching database 224 using the "modified" status as a key.

In accordance with another implementation of the invention, issued switching database change messages 244 are stored pending processing 160 in the message queue 154. The pacing of the synchronization of the information enables the reduction of size requirements of the message queue 154.

As mentioned above, in updating 222 the switching database 224 a search of the switching database 224 is performed using the origination data network node identifier as a key. If an entry is found to correspond to the origination data network node identifier, and if the entry has a "valid" status, the port specifier is checked.

If the port specifier holds the same port designation as the one determined by the MAC ADDR discovery function 220, the time stamp specifier is updated with the current time.

If the port specifier does not hold the same port designation as the one determined by the MAC ADDR discovery function 220 then: the port specifier is updated with the new port designation, the time stamp specifier is refreshed with the current time and the status specifier 234 is changed to "modified". Associations between data network node identifiers change: signifying that the corresponding data network node is a mobile data network node having just changed its connection point in the data transport network or a network failure has occurred in the data transport network and PDUs are rerouted via data transport equipment connected to the new port 106.

While in the "valid" state 308, entries are used to determine output ports 106 via which to forward PDUs. As successful switching database 224 searches 126 are performed, the time stamp specifier is refreshed with a time value at which the search 126 was performed.

The entry aging function 228, inspects 230 the entries in the switching database 224 to identify "valid" entries having a time stamp value older than a predefined period of time. Once identified the stale entries are made available for new associations to be made. In making the memory space allocated to stale entries available for further associations to be made, the status specifier 234 of the entry is set to "invalid". Subsequent to changing the status of each stale entry, the entry aging function 228 issues a switching database change message 258 to the management processor 150. Database change messages 258 may also be queued for processing in the message queue 154 if such implementation is necessary.

The entry aging function 228 may be triggered into operation via an associated timer. The entry aging function 228 may also be triggered to identify stale entries on the discovery of a new association between data network node identifier and a port 106 but failing to find an available "invalid" entry.

Implementations exist in which the MAC ADDR discovery function 220 and the entry aging function 228 are performed by a single hardware component (not shown), only the entry aging function 228 issuing switching database change messages 258 to the management processor 150.

The embodiments presented are exemplary only and persons skilled in the art would appreciate that variations to the above described embodiments may be made without departing from the spirit of the invention. The scope of the invention is solely defined by the appended claims.

We claim:

1. A method of synchronizing information held in a switching database associated with a switching function of a data switching node, with a data network node identifier record associated with a management processor, the method comprising the steps of:
   - selectively modifying an entry in the switching database based on header information extracted from protocol data units processed by the data switching node;
   - selectively setting a status specifier of said entry to signify a modification of said entry;
   - adjusting an adjustable timer to match an average rate of change of the information held in the switching database with one of an allocated processing bandwidth of the management processor and a processing speed of the management processor;
   - initiating an inspection of the switching database on the expiration of the adjustable timer;
   - identifying as part of said inspection, whether said entry was modified; and
   - selectively synchronizing upon identifying said entry was modified, the information held in said entry with the data network node identifier record, whereby a pacing of selectively synchronizing the information held in the switching database entry with the data network node identifier record is isolated from time burst changes to the information held in the switching database.

2. The method according to claim 1, wherein modifying the entry in the switching database comprises associating a data network node identifier with one of a plurality of ports of the data switching node, establishing an association in said entry between said data network node identifier and said one of the plurality of ports.

3. The method according to claim 2, wherein said one of the plurality of ports is one of an input port and an output port.

4. The method according to claim 2, wherein said data network node identifier is one of a destination data network node identifier and an origination data network node identifier.

5. The method according to claim 2, wherein modifying the entry in the switching database comprises modifying a time stamp specifier of the entry to reflect the time at Which the association was established between the data network node identifier and said one of the plurality of ports.

6. The method according to claim 2, wherein selling the status specifier of said entry comprises setting the status specifier to "modified".

7. The method according to claim 1, wherein modifying the entry in the switching database comprises updating a time stamp specifier of said entry, and aging an association in said entry between a data network node identifier and one of a plurality of ports of the data switching node.

8. A The method according to claim 7, wherein setting the status specifier of said entry comprises selling the status specifier to "invalid".

9. The method according to claim 1, wherein identifying whether said entry was modified comprises inspecting the status specifier of said entry.

10. The method according to claim 1, wherein subsequent to the step of synchronizing the information, the method further comprises a step of setting the status specifier of said entry to "valid".

11. The method according to claim 1, wherein prior to the step modifying the entry, the method further comprises a step of initializing said status specifier of said entry to "invalid".

12. A data switching node tracking switching information comprising:
   - a switching database for holding entries specifying associations between data network node identifiers and at least one of a plurality of ports of the data switching node, each entry of said entries comprising a status specifier specifying a state of said entry;
   - a management processor for maintaining a data network node identifier record;
   - an adjustable timer; and
   - an information synchronization component for identifying upon expiration of said adjustable timer, a modified entry of said entries, and for selectively synchronizing said modified entry with the data network node identifier record, whereby a pacing of selectively synchronizing said modified entry with the data network node identifier record is isolated from burst changes in the information held in the switching database wherein the state of the entry is one of "invalid", "modified" and "valid", wherein said modified entry has a status specifier of "modified", and wherein the information synchronization component only synchronizes entries having a status specifier of "modified".

13. The data switching node according to claim 12, further comprising a data network node identifier discovery component for establishing said associations specified by said entries in said switching database, and for setting the status specifier of each entry of said entries specifying associations to "modified".

14. The data switching node according to claim 12, further comprising a switching database entry aging component for identifying a stale entry in the switching database which has not been accessed for a predetermined length of time, for changing the status specifier of said stale entry to "invalid", wherein after the status specifier of said stale entry is changed to "invalid", said information synchronization component synchronizes the information held in said stale entry with the data network node identifier record.

15. The data switching node according to claim 12, wherein each entry held in the switching database has a time stamp specifier specifying a time when the entry was last accessed.

16. The data switching node according to claim 15, further comprising a data network node identifier discovery component for updating entries in the switching database to refresh said associations, and for refreshing, for each entry updated, a time stamp specifier of said entry.

17. The data switching node according to claim 15, further comprising a switching component for accessing entries in the switching database to determine said associations, and for refreshing a time stamp specifier for each entry accessed.

* * * * *